United States Patent
Mizutani et al.

(10) Patent No.: US 11,722,289 B2
(45) Date of Patent: Aug. 8, 2023

(54) PHASE SYNCHRONIZATION CIRCUIT AND IN-PHASE DISTRIBUTION CIRCUIT

(71) Applicant: Mitsubishi Electric Corporation, Tokyo (JP)

(72) Inventors: Hiroyuki Mizutani, Tokyo (JP); Sho Ikeda, Tokyo (JP); Kae Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/710,377

(22) Filed: Mar. 31, 2022

(65) Prior Publication Data
US 2022/0224507 A1    Jul. 14, 2022

Related U.S. Application Data

(63) Continuation of application No. PCT/JP2019/043791, filed on Nov. 8, 2019.

(51) Int. Cl.
*H04L 7/00* (2006.01)
*H04L 7/06* (2006.01)
*H04L 7/10* (2006.01)

(52) U.S. Cl.
CPC .............. *H04L 7/06* (2013.01); *H04L 7/0079* (2013.01); *H04L 7/0091* (2013.01); *H04L 7/10* (2013.01)

(58) Field of Classification Search
CPC ....... H04L 7/06; H04L 7/0079; H04L 7/0091; H04L 7/10; H04L 43/50; H04L 7/033;
(Continued)

(56) References Cited

U.S. PATENT DOCUMENTS 5,298,866 A * 3/1994 Kaplinsky ............ H03K 5/1504
327/261
5,852,640 A * 12/1998 Kliza ........................ G06F 1/10
327/158
(Continued)

FOREIGN PATENT DOCUMENTS

JP    2014-11561 A    1/2014
JP    2014-216804 A    11/2014
(Continued)

OTHER PUBLICATIONS

International Search Report for PCT/JP2019/043791 dated Dec. 24, 2019.
(Continued)

*Primary Examiner* — Phuong Phu
(74) *Attorney, Agent, or Firm* — Birch, Stewart, Kolasch & Birch, LLP

(57) ABSTRACT

In a case where signals branched from a single reference signal source are transmitted via a plurality of cables, a phase synchronization circuit can be used to stabilize a phase of a signal to be outputted from each cable. However, the phases of signal to be outputted from each cable is affected by combination of a length of each cable and an amount of delay caused by feedback control, so that phases of synchronization signals to be outputted from a plurality of transmission paths are not always the same as each other. In the present invention, since a frequency multiplier that multiplies a frequency of a signal outputted from each transmission path by an even number is provided for a phase synchronization circuit, the phases of the synchronization signals to be outputted from the transmission paths are aligned even when signals are branched from one reference signal.

8 Claims, 4 Drawing Sheets

(58) Field of Classification Search
CPC .......... G06F 1/10; H01Q 9/0435; H04B 3/04;
G01R 31/58; H03K 5/1504; H03L 7/06
USPC ........................ 375/356, 354, 371, 373, 375
See application file for complete search history.

(56) References Cited

U.S. PATENT DOCUMENTS

| | | | | |
|---|---|---|---|---|
| 6,535,038 | B2* | 3/2003 | Hofstra | ..................... H03L 7/06 |
| | | | | 327/158 |
| 8,669,767 | B1* | 3/2014 | Barkan | .................. G01R 31/58 |
| | | | | 324/528 |
| 2005/0238037 | A1* | 10/2005 | Dodds | ..................... H04L 43/50 |
| | | | | 370/420 |
| 2006/0198480 | A1* | 9/2006 | Doyle | ..................... H04L 7/033 |
| | | | | 375/355 |
| 2006/0224912 | A1* | 10/2006 | Denham | ................... G06F 1/10 |
| | | | | 713/600 |
| 2007/0096919 | A1* | 5/2007 | Knadle, Jr. | .......... H01Q 9/0435 |
| | | | | 235/492 |
| 2022/0014350 | A1* | 1/2022 | Morita | ..................... H04B 3/04 |

FOREIGN PATENT DOCUMENTS

| | | | |
|---|---|---|---|
| JP | 5959340 | B2 | 8/2016 |
| JP | 6127688 | B2 | 5/2017 |

OTHER PUBLICATIONS

Written Opinion of the International Searching Authority for PCT/JP2019/043791 dated Dec. 24, 2019.

* cited by examiner

PHASE SYNCHRONIZATION CIRCUIT AND IN-PHASE DISTRIBUTION CIRCUIT

CROSS REFERENCE TO RELATED APPLICATION

This application is a Continuation of PCT International Application No. PCT/JP2019/043791, filed on Nov. 8, 2019, which is hereby expressly incorporated by reference into the present application.

TECHNICAL FIELD

The present invention relates to a phase synchronization circuit and an in-phase distribution circuit.

BACKGROUND TECHNOLOGY

In a case where a signal is transmitted via a cable serving as a transmission path, there is a problem that a phase of the signal to be outputted fluctuates due to a temperature change around the cable or a vibration of the cable. In this case, there is a phase synchronization circuit that stabilizes the phase of the signal to be outputted from the cable by performing feedback control to keep a phase difference between the signal to be transmitted to the cable and a signal reflected at and returned from a destination, that is, a reflected signal constant (Patent Literature 1).

CITATION LIST

Patent Literature

Patent Literature 1: JP 2014-11561 A

SUMMARY OF INVENTION

Technical Problem

It is conceivable that, in a case that a signal is transmitted via a plurality of cables branched from a single reference signal source, such a phase synchronization circuit is used to stabilize phases of signals to be outputted from the respective cables. In this case, by installing a phase synchronization circuit in each cable, it is possible to stabilize a phase difference between each of the signals having been transmitted via the cables and a corresponding one of signals branched from one reference signal.

In the phase synchronization circuit described above, by using a round-trip signal obtained by transmission via a cable, reflection and return from a destination, and controlling a phase difference between a signal to be transmitted to the cable and the round-trip signal so that the phase difference is equal to "$2n\pi$", wherein "n" is an integer that is determined by combination of a length of the cable and an amount of delay caused by the feedback control, a phase difference of a signal transmitted via and outputted from the cable with respect to the signal to be transmitted to the cable is equal to "$n\pi$", because an effect of phase adjustment is halved. At this time, because the value of "n" is different for each cable, even when phase-aligned signals are inputted into the respective cables and thus the phases of the input and output sides of each of the cables are stabilized by the phase synchronization circuit described above, depending on whether "n" that is determined by the combination of the cable length and the delay amount caused by the feedback control is an odd number or an even number, the phases are different from each other by "$\pi$", so that phases of synchronization signals at respective destinations are different from each other.

The present disclosure has been made in order to solve the above-mentioned problem, and an object of the present disclosure is to obtain a phase synchronization circuit for aligning phases of synchronization signals to be outputted from a plurality of transmission paths in a case where in-phase signals are inputted into the plurality of transmission paths.

Solution to Problem

A phase synchronization circuit according to the present disclosure includes: phase control circuitry to output a transmission signal to a transmission path for signal transmission, and control, on a basis of a control signal corresponding to a phase difference between the transmission signal and a return signal obtained by returning the transmission signal to the transmission path, a phase of a transmission signal to be outputted to the transmission path; signal returning circuitry to return, as the return signal, part of the transmission signal outputted from the phase control circuitry to the transmission path; and a frequency multiplier to multiply, by an even number, a frequency of the transmission signal that is outputted from the transmission path and is not returned by the signal returning circuitry, and output the transmission signal having the multiplied frequency.

Advantageous Effects of Invention

According to the present disclosure, since a frequency multiplier to multiply a frequency of a signal outputted from a transmission path by an even number is provided, even in a case of where signals are branched from a single reference signal source, phases of synchronization signals to be outputted from a plurality of transmission paths are aligned.

DESCRIPTION OF EMBODIMENTS

Embodiment 1

Figure 1:
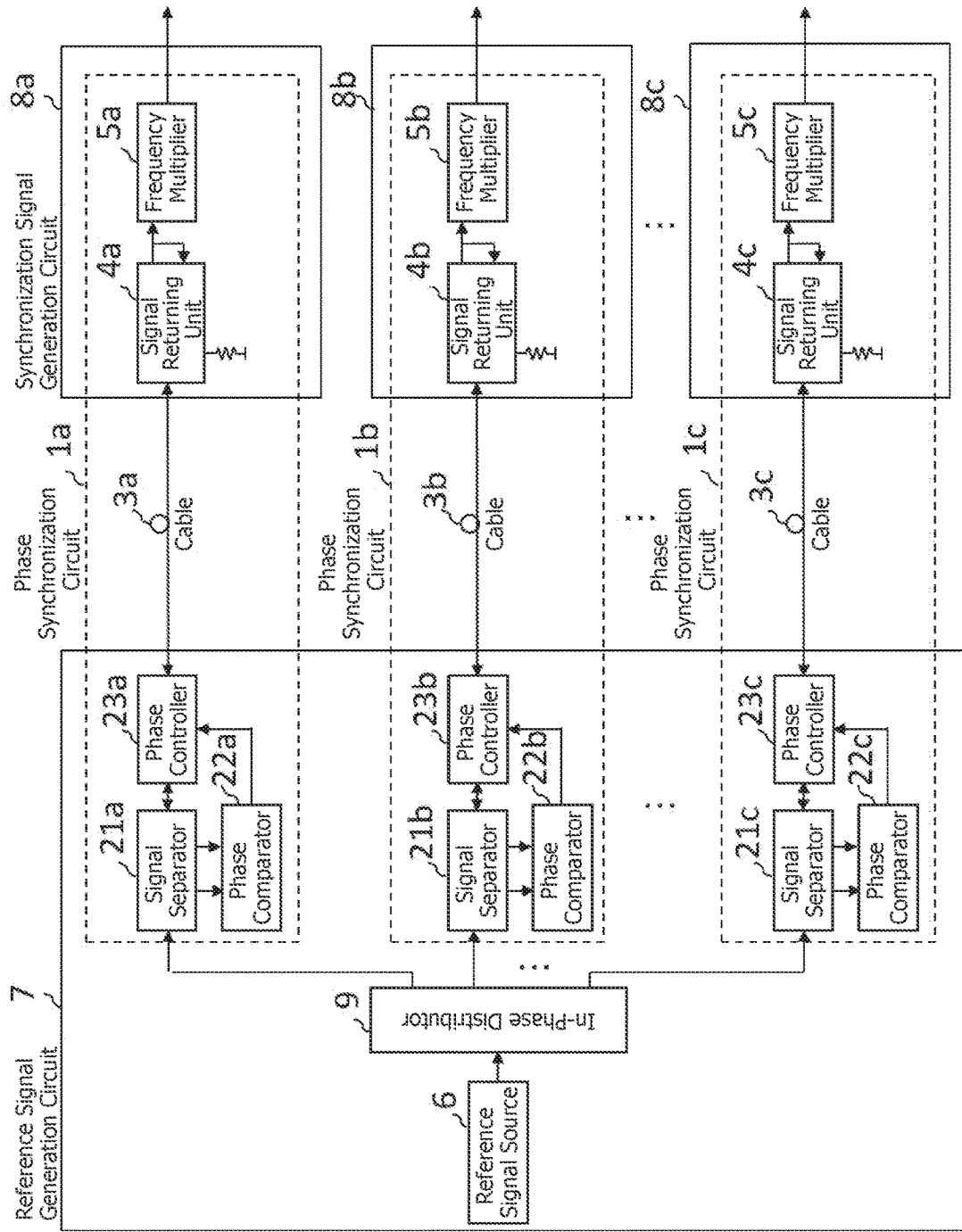
FIG. 1 is a configuration diagram illustrating a configuration of an in-phase distribution circuit according to a first embodiment.

FIG. 1 is a configuration diagram illustrating a configuration of an in-phase distribution circuit using phase synchronization circuits 1a, 1b, and 1c according to a first embodiment. In a reference signal generation circuit 7 that is a transmission source of a reference signal, the in-phase distribution circuit divides the reference signal outputted from a reference signal source 6 into a plurality of signals by using an in-phase distributor 9, and transmits, via a plurality of cables 3a, 3b, and 3c, the divided signals to the synchronization signal generation circuits 8a, 8b, and 8c that are a plurality of destinations, thereby outputting phase-aligned synchronization signals to the plurality of destinations.

The in-phase distributor 9 divides the reference signal outputted from the reference signal source 6 into a plurality of phase-aligned signals, and outputs the phase-aligned signals, as reference signals, to the signal separators 21a, 21b, and 21c of the phase synchronization circuits 1a, 1b, and 1c. For example, a device including a silicon Integrated Circuit (IC) is used for the in-phase distributor 9.

Here, the distributed signal is an electromagnetic wave and can be applied to, for example, a radio wave or a microwave. In a case where the reference signal generation circuit 7 and the synchronization signal generation circuits 8a, 8b, and 8c are separated from each other and the cables 3a, 3b, 3c are long, due to temperature change around the cables 3a, 3b, and 3c as transmission paths and vibration of the cables 3a, 3b, and 3c, phases of signals to be transmitted fluctuate, so that phases of signals to be obtained at respective destinations are misaligned. In order to correct such a phase shift, phase synchronization circuits 1a, 1b, and 1c are provided in respective transmission paths.

The reference signal source 6 is a signal source to output the reference signal to the in-phase distributor 9. For example, a crystal oscillator capable of outputting an accurate frequency is used. The reference signal from the reference signal source 6 is inputted into the in-phase distributor 9, and in-phase reference signals are supplied from the in-phase distributor 9 to the respective phase synchronization circuits 1a, 1b, and 1c.

Figure 2:
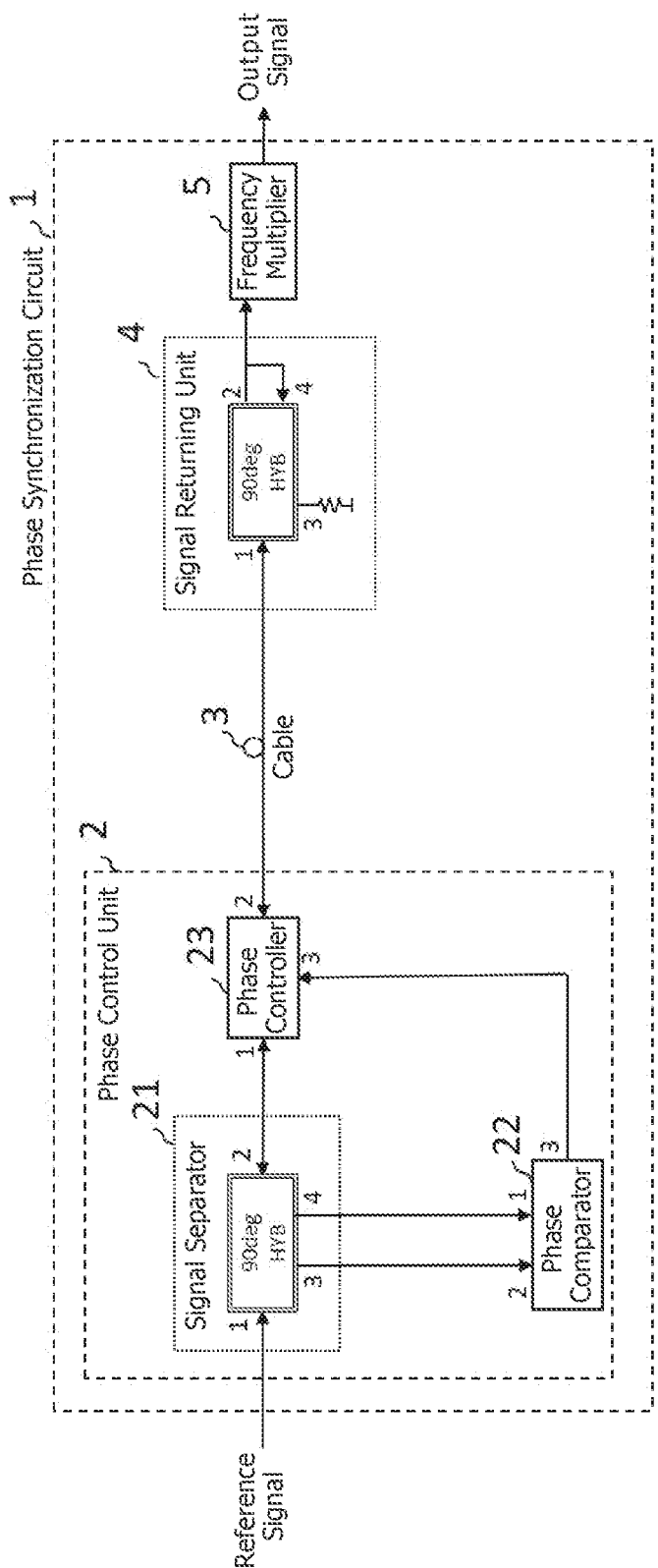
FIG. 2 is a configuration diagram illustrating a configuration of a phase synchronization circuit according to the first embodiment.

The phase synchronization circuits 1a, 1b, and 1c having the same configuration are provided in the respective transmission paths of the in-phase distribution circuit illustrated in FIG. 1. FIG. 2 is a configuration diagram illustrating the detailed configuration of the phase synchronization circuit 1 according to the first embodiment, and the phase synchronization circuits 1a, 1b and 1c each have the same configuration as the phase synchronization circuit 1.

The phase synchronization circuit 1 includes: a phase control unit 2 to output a transmission signal to a cable 3 that is a transmission path for signal transmission, and to control a phase of a signal to be outputted to the cable 3 on the basis of a control signal corresponding to a phase difference between the transmission signal and a return signal obtained by returning the transmission signal to the cable 3; a signal returning unit 4 to return part of the transmission signal outputted from the phase control unit 2 to the cable 3, as the return signal, to the cable 3; and a frequency multiplier 5 to multiply the frequency of the transmission signal that is outputted from the cable 3 and is not returned by the signal returning unit 4.

The phase control unit 2 includes: a signal separator 21, a phase comparator 22, and a phase controller 23, and controls a phase of a transmission signal to be outputted to the cable 3 on the basis of a control signal corresponding to a phase difference between a transmission signal having been outputted to the cable 3 that is a transmission path for signal transmission and a return signal obtained by returning the transmission signal to the cable 3.

The signal separator 21 receives the reference signal which is outputted from the reference signal source 6 and distributed by the in-phase distributor 9. Then, the signal separator 21 separates the reference signal into two reference signals, outputs one of the separated reference signals, as a reference signal, to the phase comparator 22, outputs the other one of the separated reference signals, as a transmission signal, to the phase controller 23, receives a return signal, from the phase controller 23, obtained by returning the transmission signal to the cable 3, and outputs the received return signal to the phase comparator 22 via the signal separator. Here, the return signal is obtained by outputting the other reference signal separated by the signal separator 21, as the transmission signal, to the phase controller 23, transmitting the transmission signal to the cable 3 from the phase controller 23, and returning the transmission signal to the cable 3 by the signal returning unit 4.

Figure 3:
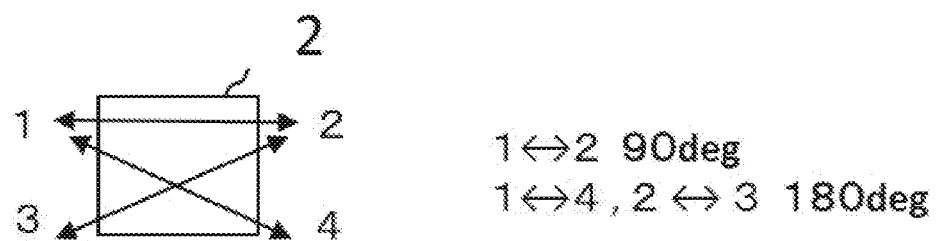
FIG. 3 is a configuration diagram of a 90-degree hybrid coupler that is used in a signal separator according to the first embodiment.

Note that the signal separator 21 can be configured by a device which has a plurality of terminals to each input and output a signal and performs signal transmission between the terminals on a basis of their predetermined relationship. The signal separator 21 can be configured by, for example, a 90-degree hybrid coupler that includes coupled lines or a lumped parameter element and is configured to perform signal transmission between the terminals as described above. Hereinafter, a case where a 90-degree hybrid coupler is used for the signal separator 21 will be described. FIG. 3 is a configuration diagram of a 90-degree hybrid coupler used in the signal separator 21 according to the first embodiment. This 90-degree hybrid coupler has a first terminal, a second terminal, a third terminal, and a fourth terminal. The first terminal and the second terminal can be passed in a two-way, and when passe a signal through, change a phase of the signal by 90 degrees. Further, the first terminal and the fourth terminal, and the third terminal and the second terminal can be passed in a two-way, when passe a signal through, change a phase of the signal by 180 degrees. Further, when a reference signal is inputted into the first terminal of the signal separator 21, the signal separator 21 separates the reference signal into a reference signal and a transmission signal, outputs the transmission signal from the second terminal, and outputs the reference signal from the fourth terminal. Further, when a return signal is inputted into the second terminal of the signal separator 21, the return signal is outputted from the third terminal.

The phase comparator 22 compares between a phase of the reference signal outputted by the signal separator 21 and a phase of a signal which has passed through the phase controller 23, has been returned by the signal returning unit 4 to the cable 3, and again has passed through the phase controller 23, and outputs a control signal based on a phase difference therebetween to the phase controller 23.

In this embodiment, the phase comparator 22 is configured to include a first terminal, a second terminal, and a third terminal. The reference signal is inputted from the fourth terminal of the signal separator 21 into the first terminal of the phase comparator 22, and the return signal is inputted from the third terminal of the signal separator 21 into the second terminal of the phase comparator 22. Then, a control signal based on a phase difference between the inputted two signals is outputted to the third terminal of the phase controller 23 from the third terminal of the phase comparator 22. This control signal is a signal for causing the phase controller 23 to perform control for changing a phase of a signal to be outputted from the phase controller 23 into the cable 3 in a direction in which the phase difference between the two signals is equal to zero. As described above, the phase comparator 22 can be any device to output a control signal by comparing the phases of the inputted two signals, and for example, a device including a silicon IC is used.

In accordance with the control signal outputted from the phase comparator 22, the phase controller 23, when the transmission signal outputted by the signal separator 21 is inputted into the phase controller 23, changes a phase of the transmission signal, and outputs the transmission signal of which the phase has been changed to the cable 3, and when the return signal transmitted via the cable 3 from the signal returning unit 4 is inputted into the phase controller 23, changes a phase of the return signal, and outputs the return signal of which the phase has been changed to the signal separator 21. The phase controller 23 can be any device that in accordance with the inputted control signal, changes a phase of a signal to be inputted and outputs the signal of which the phase has been changed.

In this embodiment, the phase controller 23 includes a first terminal, a second terminal, and a third terminal. A signal inputted from the first terminal is outputted from the second terminal after a transmission phase of the signal is changed in accordance with the control signal inputted from the third terminal, and a signal inputted from the second terminal is outputted from the first terminal in accordance with the control signal inputted from the third terminal. For example, an analog phase shifter that continuously changes a phase change amount in accordance with the control voltage outputted by the phase comparator 22 is used.

The cable 3, as a signal transmission path, connects the phase control unit 2 and the signal returning unit 4, transmits the transmission signal outputted by the phase control unit 2 to the signal returning unit 4, and transmits the return signal returned from the signal returning unit 4 to the phase control unit 2. For example, a coaxial cable or a twisted pair cable is used for the cable 3.

The signal returning unit 4 returns part of the transmission signal inputted from the phase control unit 2 to the cable 3. In this embodiment, a case where a 90-degree hybrid coupler similar to that of the signal separator 21 is used as the signal returning unit 4 will be described. When the transmission signal transmitted from the phase controller 23 to the cable 3 is inputted to a first terminal of the signal returning unit 4, the signal returning unit 4 changes a phase of the transmission signal by 90 degrees, and outputs the transmission signal of which the phase has been changed to a second terminal of the signal returning unit 4. Then, by separating the transmission signal outputted from the second terminal into two transmission signals and inputting one of the two transmission signals to a fourth terminal of the signal returning unit 4, the phase of the transmission signal inputted from the first terminal is changed by 270 degrees and outputted as a return signal from the first terminal, and the other one of the two transmission signals separated from the transmission signal is outputted to the frequency multiplier 5 as a synchronization signal. A third terminal of the signal returning unit 4 is terminated with a resistor.

The frequency multiplier 5 outputs a transmission signal that is outputted from the cable 3 and is not returned to the signal returning unit 4, as a synchronization signal after doubling a frequency of the transmission signal. In this embodiment, the transmission signal that is separated from an output of the second terminal of the 90-degree hybrid coupler as the signal returning unit 4 and is not inputted to the fourth terminal of the returning unit 4 is inputted into the frequency multiplier 5, and the phase of the transmission signal is doubled and outputted as the synchronization signal. The frequency multiplier 5 can be any device capable of multiplying an input signal by an even number, and for example, a device including a silicon IC is used.

Next, the operation of the in-phase distribution circuit according to the first embodiment of the present invention will be described.

The reference signal source 6 inputs a reference signal into the in-phase distributor 9. When the reference signal is inputted from the reference signal source 6, the in-phase distributor 9 divides the inputted reference signal into a plurality of reference signals, and outputs the in-phase reference signals to the respective phase synchronization circuits 1a, 1b, and 1c. When the reference signals are inputted into the phase synchronization circuits 1a, 1b, and 1c, synchronization signals are outputted from the respective phase synchronization circuits 1a, 1b, and 1c.

The detailed operation of the phase synchronization circuit 1 is as follows. When the reference signal is inputted into the first terminal of the signal separator 21, the signal separator 21 separates the reference signal and outputs the separated reference signals from the second and fourth terminals. When the signal separator 21 outputs the reference signal from the first terminal to the second terminal, the signal separator 21 changes the phase of the reference signal by 90 degrees, and outputs the reference signal of which the phase has been changed, as a transmission signal, to the first terminal of the phase controller 23. When the reference signal is outputted from the first terminal to the fourth terminal of the signal separator 21, the phase of the reference signal is changed by 180 degrees, and the reference signal of which the phase has been changed is outputted to the first terminal of the phase comparator 22.

The phase comparator 22 compares a phase of a return signal outputted from the third terminal of the signal separator 21 and inputted to the second terminal of the phase comparator 22 and the signal phase of the reference signal outputted from the fourth terminal of the signal separator 21 and inputted to the first terminal of the phase comparator 22. The phase comparator 22 outputs a control signal allowing the compared phase difference to be 0, to the third terminal of the phase controller 23 from the third terminal of the phase comparator 22.

The phase controller 23 changes the phase of the transmission signal inputted from the first terminal of the phase controller 23 in accordance with the control signal inputted from the phase comparator 22, and outputs the transmission signal of which the phase has been changed to the cable 3 from the second terminal. When the return signal is inputted from the second terminal of the phase controller 23, the phase of the return signal is changed in accordance with the control signal inputted from the phase comparator 22, and the return signal of which the phase has been changed is outputted from the first terminal of the phase controller 23 to the second terminal of the signal separator 21. When the return signal is inputted from the phase controller 23 to the signal separator 21, the signal separator 21 changes the phase of the return signal by 180 degrees, and outputs the return signal of which the phase has been changed from the third terminal to the phase comparator 22.

The transmission signal outputted from the phase controller 23 is transmitted along the cable 3 and is inputted into the first terminal of the signal returning unit 4. The signal returning unit 4 changes the phase of the inputted transmission signal by 90 degrees, and outputs the transmission signal of which the phase has been changed from the second terminal. The transmission signal outputted from the second terminal is divided into two transmission signals. One of the two transmission signals is inputted into the frequency multiplier 5, and the other one of the two transmission signals is inputted into the fourth terminal of the signal returning unit 4. The transmission signal inputted into the fourth terminal of the signal returning unit 4 is, after the phase thereof is changed by 180 degrees, outputted, as the return signal, to the cable 3 from the first terminal of the signal returning unit 4, and inputted into the phase controller 23.

The transmission signal outputted from the second terminal of the signal returning unit 4 and inputted into the frequency multiplier 5 is output, after a frequency thereof is doubled, as a synchronization signal of the phase synchronization circuit 1.

Here, the operation of the phase controller 23 will now be described in detail.

Hereinafter, the phase of the synchronization signal outputted from the phase synchronization circuit 1 will be described using mathematical equations.

A phase $\theta_3$ of the synchronization signal to be outputted from the second terminal of the signal returning unit 4 is represented by the following equation (1). Here, an initial phase of the reference signal to be inputted into the phase synchronization device is "$\theta_0$", a transmission phase in the phase controller 23 is "$\theta_{tune}$" and a transmission phase in the cable 3 is "$\theta_{cable}$".

(Equation 1)

$$\theta_3 = \theta_0 + \pi + \theta_{tune} + \theta_{cable} \quad (1)$$

A phase $\theta_1$ of the reference signal outputted from the fourth terminal of the signal separator 21 is represented by the following equation (2).

(Equation 2)

$$\theta_1 = \theta_0 + \pi \quad (2)$$

A phase $\theta_2$ of the transmission signal returned to the cable 3 by the signal returning unit 4 and outputted from the third terminal of the signal separator 21 is represented by the following equation (3).

(Equation 3)

$$\theta_2 = \theta_0 + 3\pi + 2\theta_{tune} + 2\theta_{cable} \quad (3)$$

Since the phase comparator 22 outputs the control signal to the phase controller 23 so that the phase difference between the phase $\theta_1$ of the reference signal outputted from the fourth terminal of the signal separator 21 and the phase $\theta_2$ of the transmission signal outputted from the third terminal is equal to zero, $\theta_2 = \theta_1 \, 2n\pi$ can be obtained in a steady state caused by this control. Therefore, the following equation (4) is obtained from the equations (2) and (3).

(Equation 4)

$$\theta_{tune} + \theta_{cable} = (n-1)\pi \quad (4)$$

By substituting the equation (4) obtained here into the equation (1), the following equation (5) is obtained.

$$\theta_3 = \theta_0 + n\pi \quad \text{(Equation 5)}$$

As can be seen from the equation (5), since the phase $\theta_3$ of the transmission signal outputted from the signal returning unit 4 is a value independent of the $\theta_{cable}$, the phase $\theta_3$ can be stabilized regardless of the temperature change around the cable 3 or the fluctuation of the vibration of the cable 3. However, as illustrated in the equation (4), "n" can have a plurality of value depending on combination of a length of the cable 3 and an amount of delay caused by feedback control, and thus it is not known whether the value of "n" is an odd number or an even number.

Here, in a case of distributing the reference signal and transmitting the reference signals along the cables 3, since the value of $\theta_3$ illustrated in the equation (5) is not known from the combination of the length of the cable 3 and the amount of delay caused by the feedback control, the signals to be outputted from the transmission paths may differ in phase from each other by $\pi$.

Therefore, the phase synchronization circuit 1 according to the present disclosure doubles the frequency of the signal outputted from the cable 3. Since the transmission signal having the phase $\theta_3$ outputted from the second terminal of the signal returning unit 4 is inputted into the frequency multiplier 5, and the frequency of the transmission signal is doubled, the phase $\theta_{out}$ of the synchronization signal outputted from the phase synchronization circuit 1 is represented by equation (6).

$$\theta_{out} = 2\theta_3 = 2\theta_0 + 2n\pi = 2\theta_0 \quad \text{(Equation 6)}$$

Thus, the phase synchronization circuit 1 according to the present invention multiplies, by an even number, the phase $\theta_3$ of the transmission signal outputted from the second terminal of the signal returning unit 4 by the frequency multiplier 5, so that the phase $\theta_{out}$ of the synchronization signal of the phase synchronization circuit 1 is in a state represented by an equation not dependent on n, as illustrated in equation (6), that is, a phase independent of the combination of the length of the cable 3 and the delay amount due to the feedback control. Therefore, when the in-phase distribution circuit that divides the reference signal into the plurality signals and transmits the signals by the plurality of cables 3 is configured, as illustrated in FIG. 1, the phases of the synchronization signals to be outputted from the plurality of transmission paths can be aligned by using the phase synchronization circuit 1.

Further, as illustrated in FIG. 1, by configuring the synchronization signal generation circuits 8 using a plurality of respective substrates, it is possible to arrange the synchronization signal generation circuits 8 at any positions each of which is not restricted by the substrate size as compared with a case where the synchronization signal generation circuits 8 are configured using one substrate.

Embodiment 2

Figure 4:
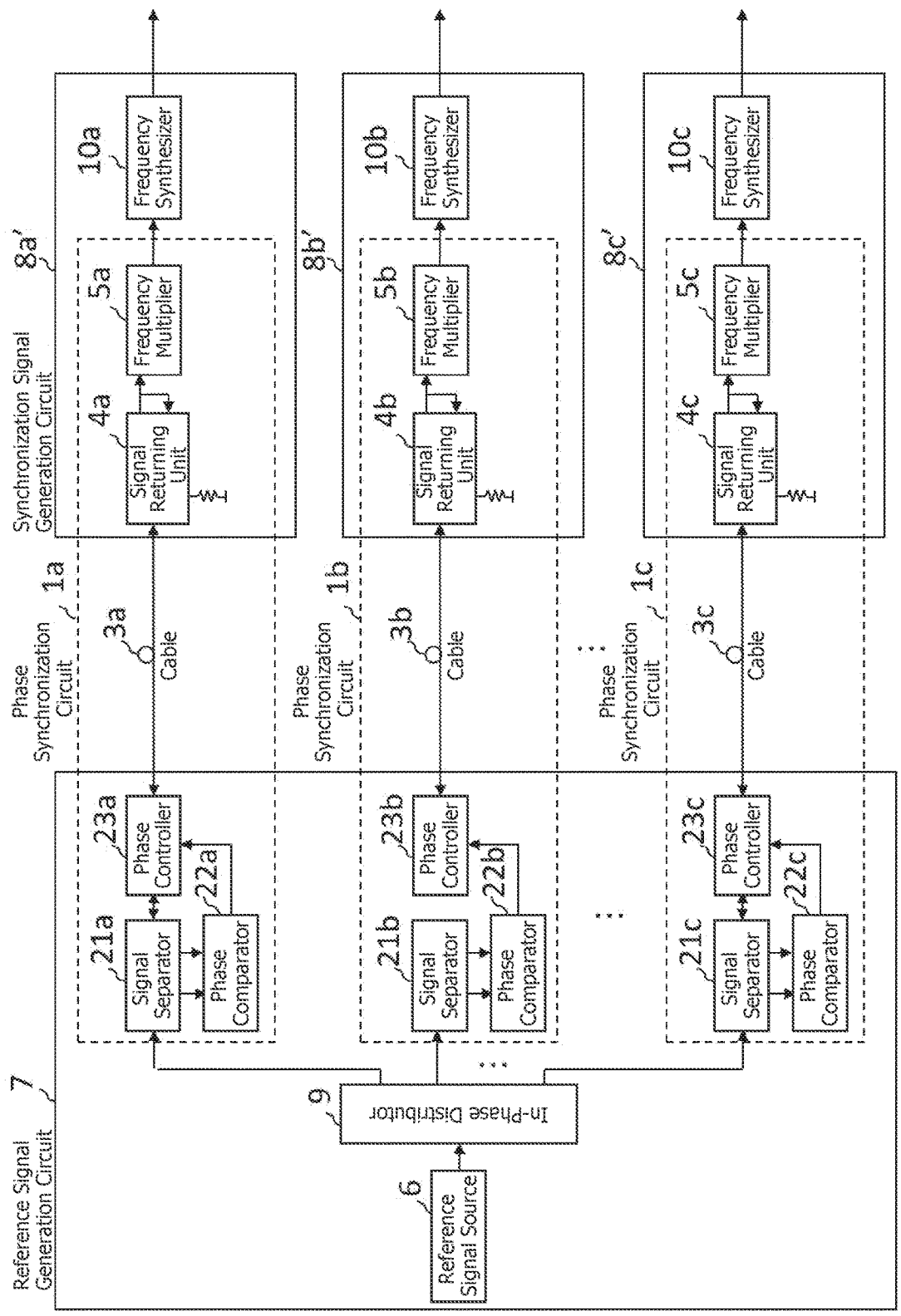
FIG. 4 is a configuration diagram illustrating a configuration of a high-frequency signal generation circuit according to a second embodiment.

Next, a high-frequency signal generation circuit according to a second embodiment will be described. FIG. 4 is a block diagram illustrating a configuration of the high-frequency signal generation circuit according to the second embodiment. Synchronization signal generation circuits 8 according to the second embodiment differ from those of the first embodiment in that the synchronization signal generation circuits 8 of the first embodiment further includes respective frequency synthesizers 10, and the remaining elements of the second embodiment are the same as those of the first embodiment.

Each of the synchronization signal generation circuit 8 includes the corresponding frequency synthesizer 10 at an output destination to which a synchronization signal is outputted from a frequency multiplier 5. The frequency synthesizer 10 generates and outputs, on the basis of an input signal, a signal that is higher in frequency than a reference signal. The frequency synthesizer 10 can output a signal having a high frequency that cannot be outputted by a reference signal source 6 such as a crystal oscillator. In addition, it is possible to output not only a continuous wave (CW: Continuous Wave) having a fixed frequency but also, for example, a chirp signal of which a frequency changes linearly with respect to time. For example, a Phase Locked Loop (PLL) can be used for the frequency synthesizer 10.

Next, the operation of the second embodiment will be described. The synchronization signal outputted from the frequency multiplier 5 is inputted into the frequency synthesizer 10. The frequency synthesizer 10 generates and outputs, on the basis of the synchronization signal, a signal that is higher in frequency than the reference signal.

Because of this configuration, in a case where the frequency synthesizers 10 each output a high-frequency continuous wave, it is possible to output phase-aligned signals from all the synchronization signal generation circuits 8. Also, in a case of outputting the chirp signal, all the synchronization signal generation circuits 8 can output phase-aligned signals. As for a device for generating a plurality of high-frequency signals, a high-frequency signal outputted from a single frequency synthesizer 10 is distributed by an in-phase distributor 9, and high-frequency cables equal in length to each other may be used, but in a method based on the present embodiment, a high-frequency signal generation circuit can be configured without using expensive high-frequency cables.

REFERENCE SIGNS LIST

1: phase synchronization circuit,
2: phase control unit,
21: signal separator,
22: phase comparator,
23: phase controller,
3: cable,
4: signal returning unit,
5: frequency multiplier,
6: reference signal source,
7: reference signal generation circuit,
8: synchronization signal generation circuit,
9: in-phase distributor, and
10: frequency synthesizer

The invention claimed is:

1. A phase synchronization circuit, comprising:
   phase control circuitry to output a transmission signal to a transmission path for signal transmission, and control, on a basis of a control signal corresponding to a phase difference between the transmission signal and a return signal obtained by returning the transmission signal to the transmission path, a phase of a transmission signal to be outputted to the transmission path;
   signal returning circuitry to return, as the return signal, part of the transmission signal outputted from the phase control circuitry to the transmission path; and
   a frequency multiplier to multiply, by an even number, a frequency of the transmission signal that is outputted from the transmission path and is not returned by the signal returning circuitry, and output the transmission signal having the multiplied frequency.

2. The phase synchronization circuit according to claim 1, wherein the phase control circuitry includes:
   a signal separator to separate the transmission signal into two transmission signals, and output the two transmission signals,
   a phase controller to control, when one of the two transmission signals outputted from the signal separator is inputted, a phase of the input transmission signal on a basis of the control signal, and output the input transmission signal of which the phase is controlled to the transmission path, and output the return signal returned by the signal returning circuitry to the signal separator, and
   a phase comparator to output, to the phase controller, the control signal corresponding to the phase difference between the other one of the two transmission signals outputted by the signal separator and the return signal outputted by the phase controller to the signal separator.

3. The phase synchronization circuit according to claim 2, wherein the signal separator includes a 90-degree hybrid coupler.

4. The phase synchronization circuit according to claim 1, wherein the signal returning circuitry includes a 90-degree hybrid coupler.

5. An in-phase distribution circuit, comprising:
   a reference signal source to generate a reference signal;
   an in-phase distributor to divides the reference signal into a plurality of in-phase signals, and output the plurality of in-phase signals as transmission signals; and
   a plurality of phase synchronization circuits to receive the respective transmission signals outputted from the in-phase distributor, wherein
   the plurality of phase synchronization circuits each include:
   phase control circuitry to control, on a basis of a control signal corresponding to a phase difference between the corresponding transmission signal outputted to a transmission path for transmission and a return signal obtained by returning the transmission signal to the transmission path, a phase of a transmission signal to be outputted to the transmission path;
   signal returning circuitry to return, as the return signal, part of the corresponding transmission signal outputted from the phase control circuitry to the transmission path;
   a frequency multiplier to multiply, by an even number, a frequency of the corresponding transmission signal that is outputted from the transmission path and is not returned by the signal returning circuitry, and output the transmission signal having the multiplied frequency.

6. The in-phase distribution circuit according to claim 5, further comprising: a plurality of frequency synthesizer to each generate a signal that is higher in frequency than the reference signal on a basis of the signal outputted from the corresponding frequency multiplier.

7. The in-phase distribution circuit according to claim 5, wherein the signal returning circuitry and the frequency multiplier are provided on a single board, for the corresponding transmission path of the in-phase distribution circuit.

8. The in-phase distribution circuit according to claim 6, wherein the signal returning circuitry and the frequency multiplier are provided on a single board, for the corresponding transmission path of the in-phase distribution circuit.

* * * * *